U S007892867B2

(12) United States Patent
Shinn et al.

(10) Patent No.: US 7,892,867 B2
(45) Date of Patent: Feb. 22, 2011

(54) METHOD FOR MANUFACTURING FLEXIBLE DISPLAY PANEL

(75) Inventors: Ted-Hong Shinn, Hsinchu (TW); Hung-Pin Su, Hsinchu (TW); Jui-Chung Cheng, Hsinchu (TW); Yi-Ching Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 32 days.

(21) Appl. No.: 12/169,654

(22) Filed: Jul. 9, 2008

(65) Prior Publication Data

US 2009/0230280 A1 Sep. 17, 2009

(30) Foreign Application Priority Data

Mar. 14, 2008 (TW) .............................. 97109047 A

(51) Int. Cl.
*H01L 21/00* (2006.01)

(52) U.S. Cl. ............................ 438/26; 438/34; 438/106; 438/152; 438/458; 257/E21.532; 257/E21.6

(58) Field of Classification Search ................... 438/25, 438/26, 106, 455, 458, 33, 34, 152, 463; 257/E33.057, E21.023, E21.028, E21.532, 257/E21.6; 349/158, 160

See application file for complete search history.

(56) References Cited

U.S. PATENT DOCUMENTS

| 2003/0222334 A1* | 12/2003 | Ikeda et al. | .................. 257/678 |
| 2007/0212853 A1* | 9/2007 | Maruyama et al. | .......... 438/458 |
| 2009/0239320 A1* | 9/2009 | Takayama et al. | ............. 438/27 |

* cited by examiner

*Primary Examiner*—Julio J Maldonado
(74) *Attorney, Agent, or Firm*—Chun-Ming Shih

(57) ABSTRACT

A carrier applicable to a laser releasing process and for carrying at least a flexible display panel is provided. The flexible display panel is formed on a transparent substrate and includes a display main body and a driving circuit module connected to an edge of the display main body. The carrier includes a carrying plate having at least a carrying area for carrying the flexible display panel and a protecting cover disposed on the carrying plate and located at an edge of the carrying area. A receiving space is formed between the protecting cover and the carrying plate for receiving the driving circuit module. The protecting cover is for shielding the driving circuit module to prevent the driving circuit module from being irradiated by a laser beam in the laser releasing process. A method for manufacturing flexible display panel also is provided.

13 Claims, 3 Drawing Sheets

METHOD FOR MANUFACTURING FLEXIBLE DISPLAY PANEL

BACKGROUND

1. Technical Field

The present invention generally relates to a display panel and, more particularly, to a method for manufacturing flexible display panel and a carrier for the manufacturing method.

2. Description of the Related Art

A thin film transistor liquid crystal display (TFT LCD) panel generally includes a glass substrate, a transparent protection layer disposed spaced apart from and opposite to the glass substrate, a liquid crystal layer sandwiched between the glass substrate and the transparent protection layer and a driving circuit module. The glass substrate has a thin film transistor array and a plurality of pixel electrodes formed thereon. The transparent protection layer has a common electrode formed thereon. The driving circuit module is electrically connected with the thin film transistor array, the pixel electrodes and the common electrode and for controlling the TFT LCD panel.

An electrophoretic display (EPD) panel is a type of display panel based on an electrophoresis of affecting charged particles dispersed in a dielectric solvent. The electrophoretic display panel generally includes a glass substrate, a transparent protection layer disposed spaced apart from and opposite to the glass substrate, an electrophoretic layer arranged between the glass substrate and the transparent protection layer and a driving circuit module. The driving circuit module is for controlling the electrophoretic display panel. In addition, the electrophoretic display panel can be classified into two types of passive matrix type and active matrix type according to the driving manners. In particular, for a passive matrix type electrophoretic display panel, a plurality of row electrodes formed on the glass substrate and a plurality of transparent column electrodes formed on the transparent protection layer are necessary. For an active matrix type electrophoretic display panel, a thin film transistor array and a plurality of pixel electrodes formed on the glass substrate and a transparent plate-shaped electrode formed on the transparent protection layer are essential.

It is understood that the display panel is not limited to the above-mentioned TFT LCD display panel and electrophoretic display panel, and can be other type display panel such as an organic light emitting diode (OLED) display panel, the structural configuration thereof will not be described in detail herein.

With the applications of the display panels becoming more widespread and most of them are applicable to portable devices, the demand of miniaturization is increasingly required. In such a background, it is becoming more and more important on how to design out a slim and lightweight display panel. Nowadays, a flexible display panel with a flexible substrate instead to replace the traditional glass substrate can achieve the above-mentioned advantages and thus would potentially become a market focus as well as one of the future products.

In order to greatly minimize a difference between the manufacturing processes of the flexible display panel and the traditional display panel with glass substrate, a conventional manufacturing process of the flexible display panel is that firstly forming a flexible display panel on a glass substrate and then performing a laser releasing process to separate the flexible display panel from the glass substrate. The advantage of the conventional manufacturing process is that it is similar to that of the traditional display panel with glass substrate.

However, in the laser releasing process, it is necessary to accurately preset the optical path of the laser beam to avoid the laser beam to damage the driving circuit module of the flexible display panel. Even so, the driving circuit module still could not escape the influence of the laser beam resulting from the inherent characteristics of energy distribution, interference and diffraction of the laser beam, the manufacture yield of the flexible display panel is degraded in some degree as a result.

BRIEF SUMMARY

The present invention relates to a carrier applicable to a laser releasing process for improving the manufacture yield of a flexible display panel.

The present invention further relates to a method for manufacturing flexible display panel to improve manufacture yield.

In order to achieve the above-mentioned advantages, a carrier in accordance with an embodiment of the present invention is provided. The carrier is applicable to a laser releasing process for carrying a flexible display panel. The flexible display panel is formed on a transparent substrate and includes a display main body and a driving circuit module connected to an edge of the display main body. The carrier includes a carrying plate and at least a protecting cover. The carrying plate has at least a carrying area for carrying the flexible display panel. The protecting cover is disposed on the carrying plate and at an edge of the carrying area. A receiving space is formed between the protecting cover and the carrying plate for receiving the driving circuit module. The protecting cover is configured (i.e., structured and arranged) for shielding the driving circuit module to prevent the driving circuit module from being irradiated by a laser beam in the laser releasing process.

In one embodiment of the present invention, a portion of the carrying plate opposite to the protecting cover has at least one opening for receiving at least an electronic component of the driving circuit module.

In one embodiment of the present invention, the protecting cover is made of metal.

In one embodiment of the present invention, the protecting cover is made of reflective material.

In one embodiment of the present invention, the material of the protecting cover is same as the material of the carrying plate.

In one embodiment of the present invention, a number of the carrying area of the carrying plate is multiple, a number of the protecting cover of the carrier is multiple, the multiple carrying areas are for carrying the transparent substrates, the protecting covers are respectively disposed at the edges of the carrying areas.

A method for manufacturing flexible display panel in accordance with another embodiment of the present invention is provided. The method includes the following steps. Firstly, a flexible display panel is formed on a transparent substrate, wherein the flexible display panel includes a display main body and a driving circuit module connected to an edge of the display main body. Then, the driving circuit module of the flexible display panel is shielded. Afterward, a laser releasing process is performed to separate the flexible display panel from the transparent substrate.

In one embodiment of the present invention, a method of shielding the driving circuit module includes following steps. Firstly, a carrier is provided. The carrier includes a carrying plate and a protecting cover, wherein the carrying plate has a carrying area, the protecting cover is disposed on the carrying plate and at an edge of the carrying area. A receiving space is formed between the protecting cover and the carrying plate. Then, the transparent substrate with the flexible display panel is disposed on the carrying area and the driving circuit module is positioned in the receiving space, and whereby the flexible display panel is located between the transparent substrate and the carrying area.

In one embodiment of the present invention, a portion of the carrying plate opposite to the protecting cover has at least one opening, and the method of shielding the driving circuit module further includes positioning at least an electronic component of the driving circuit module in the opening.

In one embodiment of the present invention, a method of performing the laser releasing process includes irradiating the transparent substrate and the flexible display panel by a laser beam from a side of the transparent substrate facing away from the flexible display panel.

In one embodiment of the present invention, the laser beam has a wavelength in the range from 300 nanometers (nm) to 400 nanometers.

In one embodiment of the present invention, the laser beam has a pulse energy in the range from 250 millijoules (mJ) to 700 millijoules.

In one embodiment of the present invention, the flexible display panel is an electrophoretic display panel.

In the method for manufacturing flexible display panel of the present invention, the driving circuit module is shielded to avoid the laser beam to damage the driving circuit module when the laser releasing process is performed for separating the flexible display panel from the transparent substrate. Accordingly, the method for manufacturing flexible display panel of the present invention can improve manufacture yield. In addition, the carrier of the present invention is applicable to the laser releasing process to prevent the driving circuit module from damage caused by the laser beam and thereby the manufacture yield of the flexible display panel can be improved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology used herein is for the purpose of description and should not be regarded as limiting.

Figure 1:
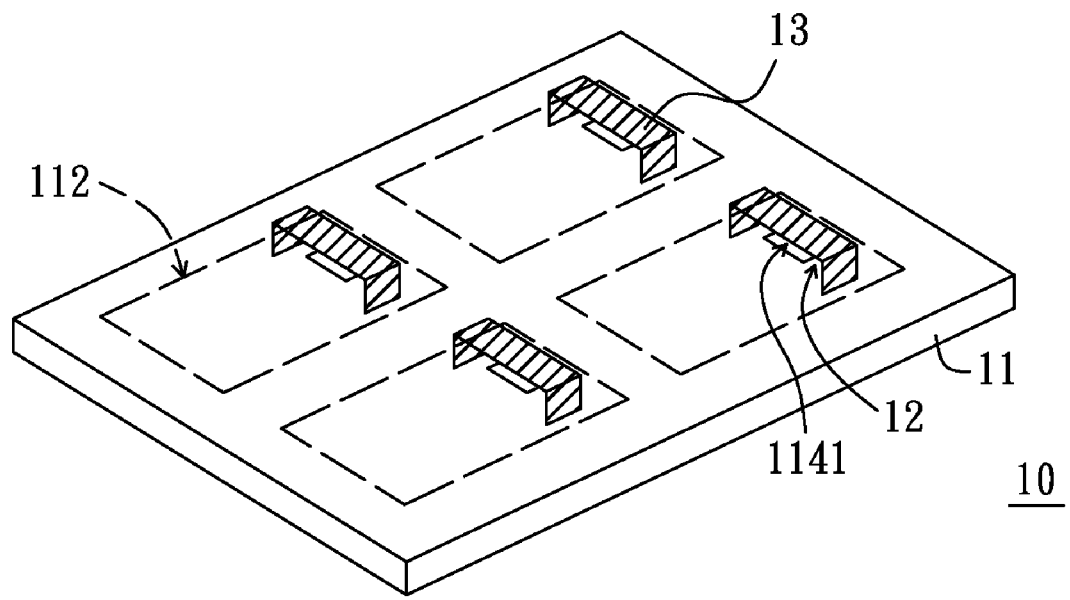
FIG. 1 is a schematic, three-dimensional view of a carrier applicable to a method for manufacturing flexible display panel, in accordance with an embodiment of the present invention.

Referring to FIG. 1, a carrier 10 in accordance with an embodiment of the present invention is provided. The carrier 10 is applicable to a laser releasing process for separating/releasing a flexible display panel from a transparent substrate by a laser irradiation. The carrier 10 is configured (i.e., structured and arranged) for carrying at least one flexible display panel. The carrier 10 includes a carrying plate 11 and at least one protecting cover 13 disposed on the carrying plate 11. The carrying plate 11 has at least one carrying area 112 each for carrying a flexible display panel. Each protecting cover 13 is configured at an edge of one carrying area 112. A receiving space 12 is respectively formed between each protecting cover 13 and the carrying plate 11. Each protecting cover 13 is made of the material can block a laser beam. For example, each protecting cover 13 can be made of the reflective material such as, but not limited to, a metal. Furthermore, the material of each protecting cover 13 can be same as or different from that of the carrying plate 11. When the each protecting cover 13 and the carrying plate 11 all are made of a metal, each protecting cover 13 can be formed on the carrying plate 11 by welding.

In the present embodiment, as illustrated in FIG. 1, the carrying plate 11 has four carrying areas 112, the carrier 10 has four protecting covers 13 and thereby four receiving spaces 12 are correspondingly formed. It is understood that the number of the carrying areas 112 and the number of the protecting areas 13 each are not limited to four, and can be one, or two, three or more than four for achieving batch manufacturing.

Figure 2:
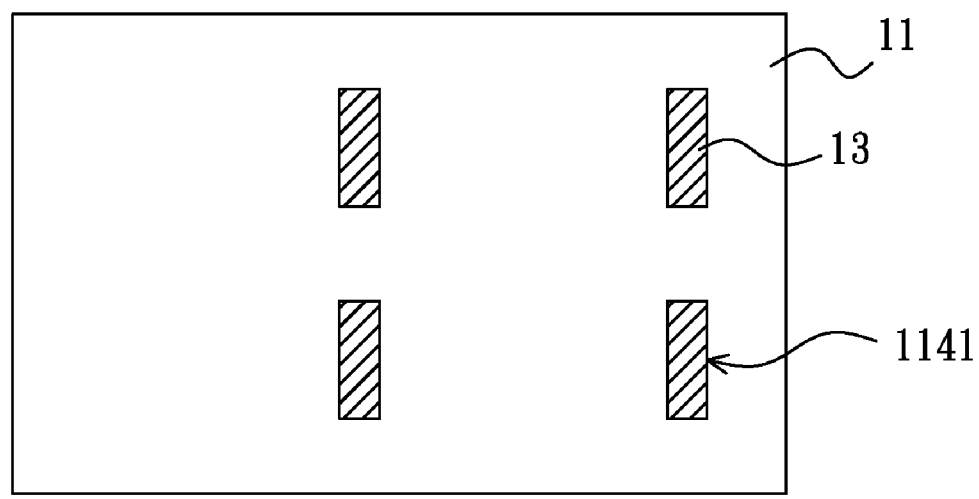
FIG. 2 is a schematic, bottom view of the carrier depicted in FIG. 1

FIG. 2 is a schematic, bottom view of the carrier depicted in FIG. 1. Referring to FIG. 1 with FIG. 2 together, a portion of the carrying plate 11 opposite to each of the protecting covers 13 has at least one opening 1141. Each opening 1141 can be a blind hole or a through hole. In the illustrated embodiment, each opening 1141 is a through hole.

Referring to FIG. 3 through FIG. 6, a method for manufacturing flexible display panel by using the carrier 10 in a laser releasing process will be described below in detail accompanying the corresponding drawings. The manufacturing method includes the following steps.

Figure 3:
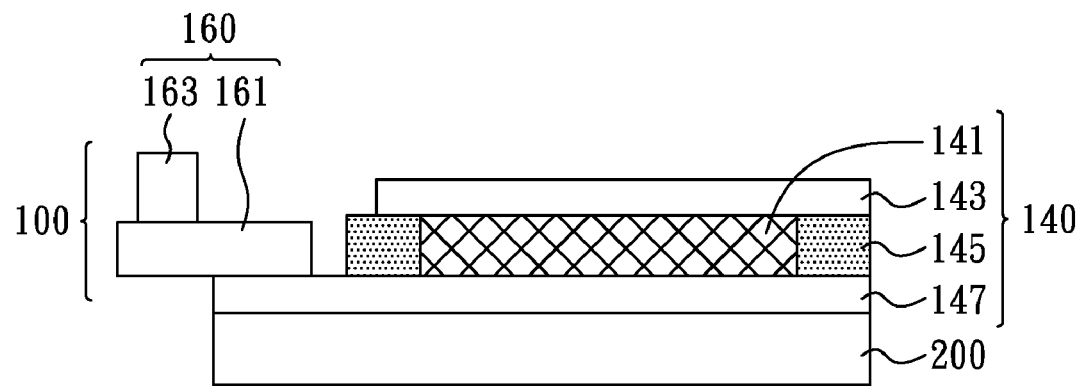
FIG. 3 through FIG. 6 illustrates a flow chart of the method for manufacturing flexible display panel, in accordance with an embodiment of the present invention.

Firstly, as illustrated in FIG. 3, a flexible display panel 100 is formed on a transparent substrate 200. In particular, the transparent substrate 200 can be a glass substrate or other suitable transparent substrate in dependence of the practical requirements. In addition, the flexible display panel 100 can be, but not limited to, an electrophoretic display panel. The flexible display panel 100 includes a display main body 140 and at least a driving circuit module 160. The display main body 140 includes an electrophoretic layer 141, a transparent protection layer 143, an edge protection material 145 and a flexible plate 147. The flexible plate 147 is arranged on the transparent substrate 200. The electrophoretic layer 141 is formed on the flexible plate 147. The transparent protection layer 143 is configured on the electrophoretic layer 141. The edge protection material 145 is disposed between the flexible plate 147 and the transparent protection layer 143 and surrounds/encloses the electrophoretic layer 141. The driving circuit module 160 is located at least one side of the display main body 140. The driving circuit module 160 as illustrated in FIG. 3 is located at one side of the display main body 140. It is understood that the driving circuit module 160 can be divided into multiple parts in dependence of the practical circuit arrangement and located at two even three sides of the display main body 140.

The flexible plate 147 can be attached on the transparent substrate 200. The flexible plate 147 can be made of a plastic such as polyimide (PI), polyethylene terephthalate (PET), polyethersulfone (PES) or polycarbonate (PC) which facilitates the flexible plate 147 to be readily released from the transparent substrate 200 by the irradiation of an invisible laser beam. The invisible laser beam can be an ultraviolet laser beam having a wavelength in the range from 300 nanometers (nm) to 400 nm. The flexible plate 147 has an essential circuit and a first driving electrode (not shown) formed thereon.

The electrophoretic layer 141 generally is a film structure. The electrophoretic layer 141 contains a dielectric solvent and a plurality of charged particles dispersed in the dielectric solvent. The transparent protection layer 143 can be made of a transparent/translucent plastic and disposed at a side of the eletrophoretic layer 141 facing away from the flexible plate 147. The transparent protection layer 143 has a second driving electrode (not shown) formed thereon. The second driving electrode is a transparent electrode, e.g., an indium tin oxide (ITO) electrode. The second driving electrode is matched with the first driving electrode formed on the flexible plate 147. The edge protection material 145 is arranged between the flexible plate 147 and the transparent protection layer 143 and surrounds the electrophoretic layer 141. The edge protection material 145 can be made of a resin such as phenoxy resin.

The driving circuit module 160 for example includes a flexible printed circuit board (FPCB) 161 and at least one electronic component 163 (e.g., chip) formed on the FPCB 161. The FPCB 161 is arranged on the flexible plate 147 and electrically connected to the essential circuit and the first driving electrode formed on the flexible plate 147.

The process of manufacturing the flexible display panel 100 on the transparent substrate 200 is well-known to the skilled in the art and thus will not be described in detail herein. In addition, the flexible display panel 100 also can be a liquid crystal display (LCD) panel, an organic light emitting diode (OLED) display panel or other display panel.

Figure 4:
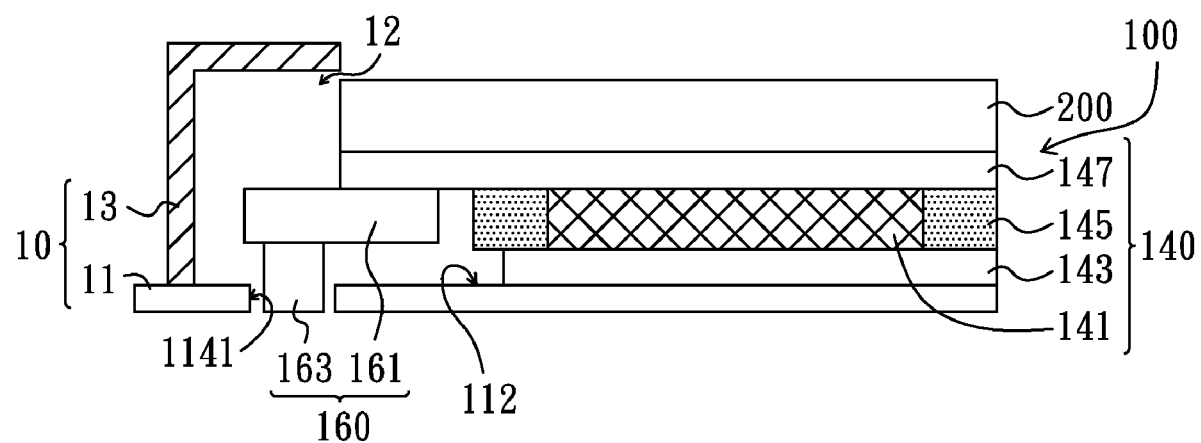

After the formation of the flexible display panel 100 on the transparent substrate 200, the driving circuit module 160 of the flexible display panel 100 is shielded. As illustrated in FIG. 4, a method of shielding the driving circuit module 160 actually is the result of several steps as follows. A carrier 10 as illustrated in FIG. 1 is provided, the transparent substrate 200 with the flexible display panel 100 are disposed on the carrying area 112 and the driving circuit module 160 is positioned in the receiving space 12. The flexible display panel 100 is located between the transparent substrate 200 and the carrying area 112. In addition, an electronic component 163 of the driving circuit module 160 is positioned in the opening 1411 to facilitate the display main body 140 to evenly lie in the carrying area 112 and protect the electronic component 163 from damage resulting from extrusion.

Figure 5:
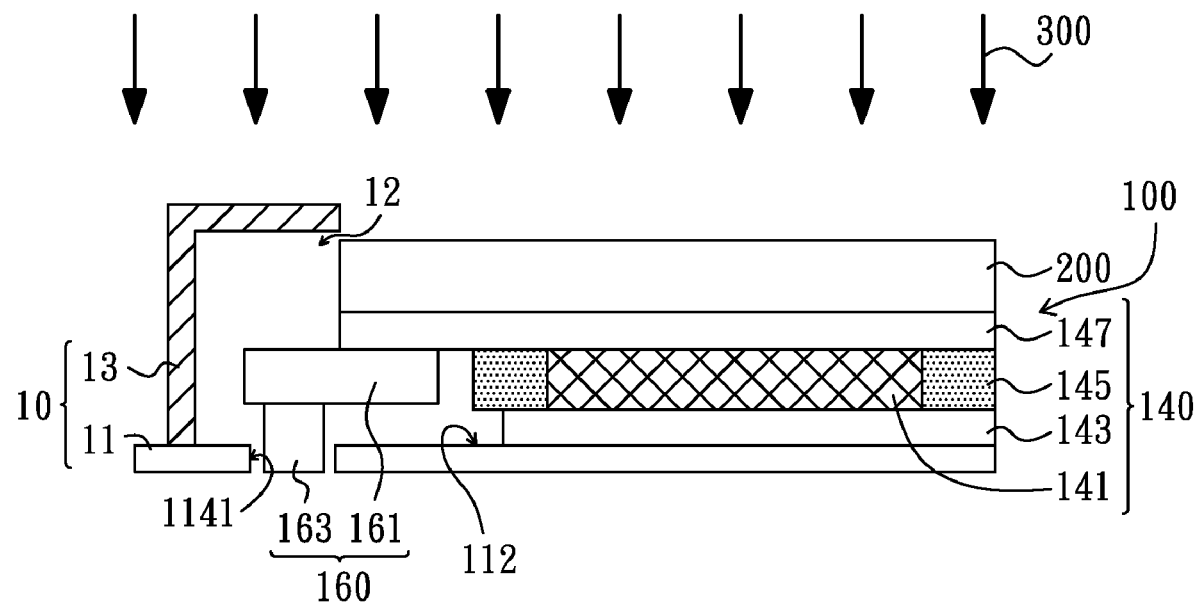
Figure 6:
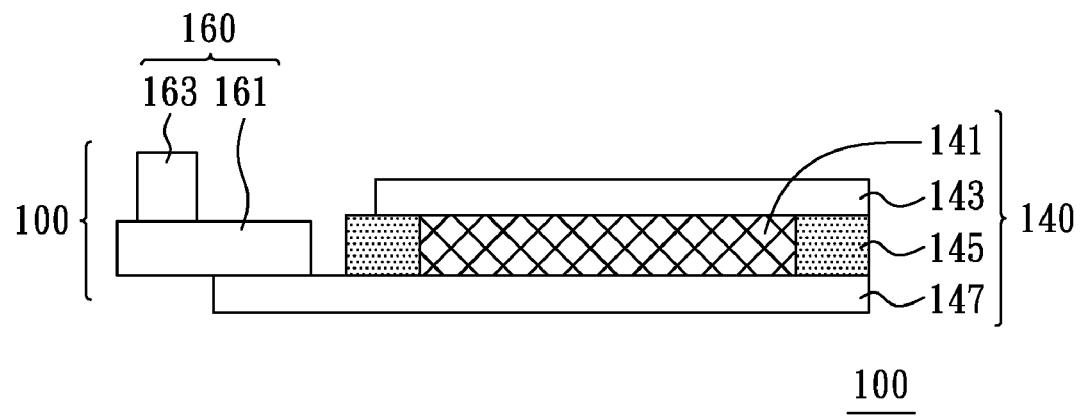

Subsequently, referring to FIG. 5, a laser releasing process is performed to release/separate the flexible display panel 100 from the transparent substrate 200. More specifically, the laser releasing process includes the following step of irradiating the transparent substrate 200 with the flexible display panel 100 by a laser beam 300 from a side of the transparent substrate 200 facing away from the flexible display panel 100, to release the flexible display panel 100 from the transparent substrate 200 (as illustrated in FIG. 6). In addition, a wavelength of the laser beam 300 can be in the range from 300 nm to 400 nm. A pulse energy of the laser beam 300 can be in the range from 250 mJ to 700 mJ.

The present embodiment utilizes the protecting cover 13 of the carrier 10 to shield the driving circuit module 160 and thereby can avoid the laser beam 300 to irradiate the FPCB 161 and the electronic component 163 of the driving circuit module 160 in the laser releasing process. Accordingly, the FPCB 161 and the electronic component 163 can be protected from damage in the laser releasing process and thus the manufacture yield of the flexible display panel can be greatly improved. In addition, the carrier is applicable to the laser releasing process to shield the driving circuit module 160, therefore in the laser releasing process, even if the accuracy of the preset optical path is relatively lower in some degree, the damage applied to the driving circuit module 160 resulting from the inherent characteristics of energy distribution, interference and diffraction of the laser beam 300 can be effectively avoided.

It is indicated that the FIG. 1 shows four protecting cover 13 and thus four the transparent substrate 200 with the flexible display panel 100 can be loaded on the carrier 10 to achieve the purpose of batch process. In addition, one skilled in the art can suitably modify the structural configuration of the flexible display panel 100, and/or the wavelength and/or pulse energy of the laser beam, etc., so long as it does not deviate from the spirit of the present invention.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for manufacturing flexible display panel, comprising:
    forming a flexible display panel on a transparent substrate, the flexible display panel comprising a flexible plate, a display main body and a driving circuit module connected to an edge of the display main body, the display main body comprising a flexible plate;
    shielding a portion of the driving circuit module of the flexible display panel, wherein the portion of the driving circuit module is not overlapped with the flexible plate; and
    performing a laser releasing process to separate the flexible display panel from the transparent substrate after shielding the portion of the driving circuit module of the flexible display panel.

2. The method according to claim 1, wherein the step of shielding the driving circuit module comprises:
    providing a carrier, the carrier comprising a carrying plate and a protecting cover, the carrying plate having a carrying area, the protecting cover being disposed on the carrying plate and located at an edge of the carrying area, and a receiving space being formed between the protecting cover and the carrying plate; and
    disposing the transparent substrate with the flexible display panel formed thereon on the carrying area and positioning the driving circuit module in the receiving space, and the flexible display panel being located between the transparent substrate and the carrying area.

3. The method as claimed in claim 2, wherein a portion of the carrying plate opposite to the protecting cover has at least one opening, and the method of shielding the driving circuit module further comprises a step of positioning at least an electronic component of the driving circuit module in the opening.

4. The method as claimed in claim 1, wherein the step of performing the laser releasing process comprises irradiating the transparent substrate and the flexible display panel by a laser beam from a side of the transparent substrate facing away from the flexible display panel.

5. The method as claimed in claim 4, wherein the laser beam has a wavelength in a range from 300 nanometers to 400 nanometers.

6. The method as claimed in claim 4, wherein the laser beam has a pulse energy in a range from 250 millijoules to 700 millijoules.

7. The method as claimed in claim 1, wherein the flexible display panel is an electrophoretic display panel.

8. A method for manufacturing flexible display panel, comprising:

forming a flexible display panel on a transparent substrate, the flexible display panel comprising a display main body and driving circuit module connected to an edge of the display main body;

shielding the driving circuit module of the flexible display panel; and performing a laser releasing process to separate the flexible display panel from the transparent substrate, wherein the step of shielding the driving circuit module comprises:

providing a carrier, the carrier comprising a carrying plate and a protecting cover, the carrying plate having a carrying area, the protecting cover being disposed on the carrying plate and located at an edge of the carrying area, and a receiving space being formed between the protecting cover and the carrying plate; and disposing the transparent substrate with the flexible display panel formed thereon on the carrying area and positioning the driving circuit module in the receiving space, and the flexible display panel being located between the transparent substrate and the carrying area.

9. The method as claimed in claim 8, wherein a portion of the carrying plate opposite to the protecting cover has at least one opening, and the method of shielding the driving circuit module further comprises a step of positioning at least an electronic component of the driving circuit module in the opening.

10. The method as claimed in claim 8, wherein the step of performing the laser releasing process comprises irradiating the transparent substrate and the flexible display panel by a laser beam from a side of the transparent substrate facing away from the flexible display panel.

11. The method as claimed in claim 10, wherein the laser beam has a wavelength in a range from 300 nanometers to 400 nanometers.

12. The method as claimed in claim 10, wherein the laser beam has a pulse energy in a range from 250 millijoules to 700 millijoules.

13. The method as claimed in claim 8, wherein the flexible display panel is an electrophoretic display panel.

* * * * *